62-542

5/9/85 OR RE 32,241

SR

United States Patent [19]

Saxer

[11] E Patent Number: Re. 32,241

[45] Reissued Date of Patent: Sep. 9, 1986

[54] FRACTIONAL CRYSTALLIZATION PROCESS

[75] Inventor: Kurt Saxer, Buchs, Switzerland

[73] Assignee: Sulzer Brothers Limited, Winterthur, Switzerland

[21] Appl. No.: 601,785

[22] Filed: Apr. 18, 1984

Related U.S. Patent Documents

Reissue of:

[64] Patent No.: 3,621,664
Issued: Nov. 23, 1971
Appl. No.: 720,553
Filed: Apr. 11, 1968

[30] Foreign Application Priority Data

Apr. 14, 1967 [AT] Austria ..... 3510/67

[51] Int. Cl. ..... B01D 9/00
[52] U.S. Cl. ..... 62/542; 62/544
[58] Field of Search ..... 62/532, 541, 544, 542

[56] References Cited

U.S. PATENT DOCUMENTS

| | | | |
|---|---|---|---|
| Re. 25,940 | 12/1965 | Davids | 62/58 |
| 795,753 | 7/1905 | Barrath | 62/348 |
| 893,006 | 7/1908 | Monti | 62/348 |
| 1,931,347 | 10/1933 | Gay | 62/348 |
| 2,085,521 | 6/1937 | Anderson et al. | 62/58 |
| 2,340,721 | 2/1944 | Whitney | 62/347 |
| 2,622,114 | 12/1952 | Carney | 23/273 F |
| 2,628,485 | 2/1953 | Toulmin, Jr. | 62/58 |
| 2,747,375 | 5/1956 | Pichler | 62/348 |
| 2,775,100 | 12/1956 | Howe | 62/348 |
| 2,778,205 | 1/1957 | Berger | 62/58 |
| 3,228,838 | 1/1966 | Rinfret et al. | 62/74 |
| 3,305,320 | 2/1967 | Weech | 62/58 |
| 3,449,087 | 6/1969 | Saylor | 23/296 |

FOREIGN PATENT DOCUMENTS

| | | | |
|---|---|---|---|
| 571087 | 9/1958 | Belgium | 23/308 |

*Primary Examiner*—S. Leon Bashore
*Assistant Examiner*—Hastings, K. M.
*Attorney, Agent, or Firm*—Werner W. Kleeman

[57] ABSTRACT

A single or multi-step fractional crystallization process and apparatus for separating fluid material having two or more components, the material flowing down a cooled wall surface and a component crystallizing thereon. Each step comprises a single crystallization and all steps of a complete cycle are conducted within a single crystallizer.

3 Claims, 1 Drawing Figure

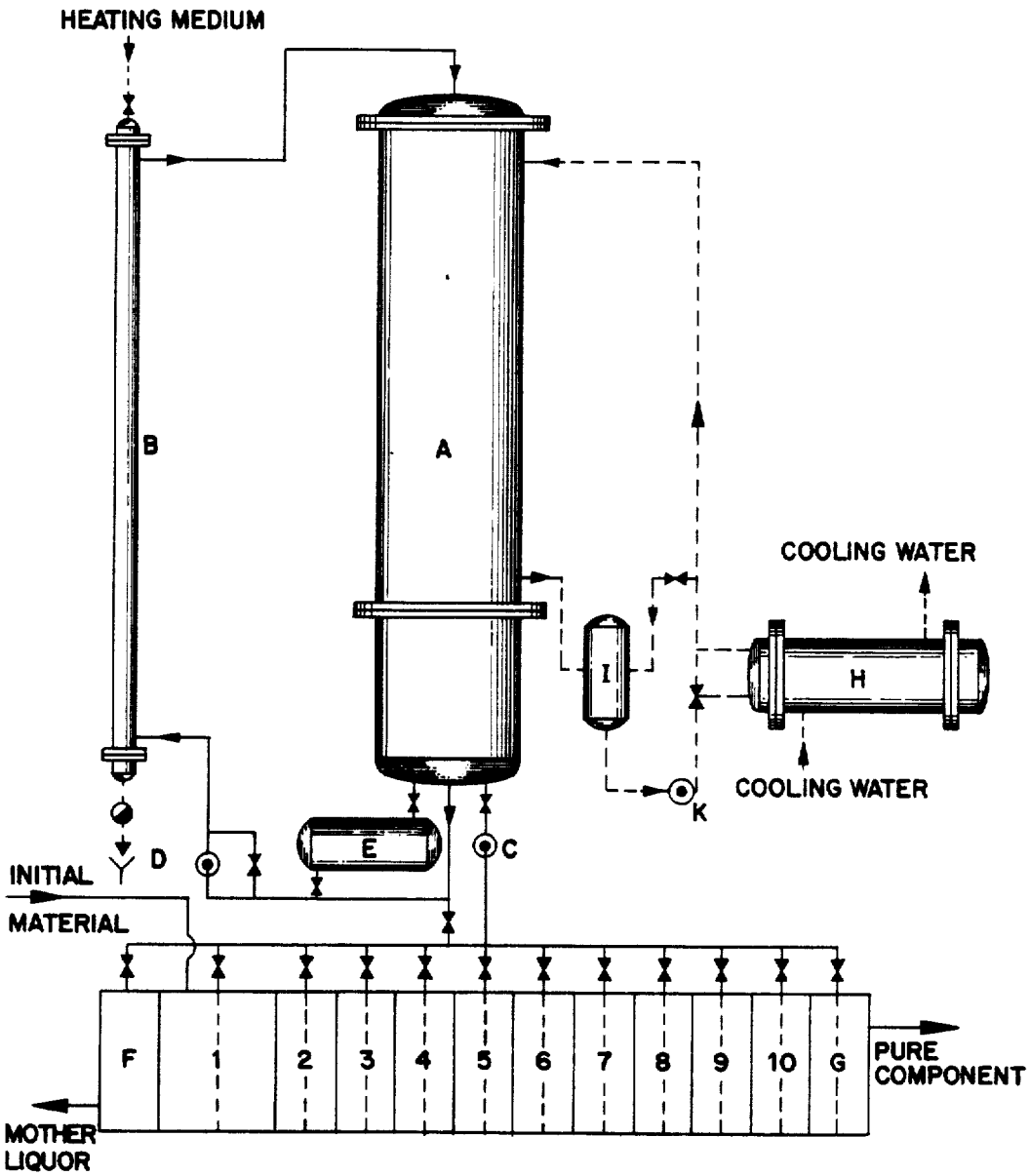
HEATING MEDIUM
B
A
COOLING WATER
I
H
COOLING WATER
K
D
E
C
INITIAL
MATERIAL
F
1
2
3
4
5
6
7
8
9
10
G
PURE
COMPONENT
MOTHER
LIQUOR

FRACTIONAL CRYSTALLIZATION PROCESS

Matter enclosed in heavy brackets [ ] appears in the original patent but forms no part of this reissue specification; matter printed in italics indicates the additions made by reissue.

BACKGROUND OF THE INVENTION

The invention relates to a process for the separation or purification, in one or more steps, of molten, liquid, or dissolved compounds or mixtures by fractional crystallization and to an apparatus for performing said process. The process and apparatus of the invention enable the economical separation of multicomponent materials on an industrial scale. Multiple-step fractional crystallization is carried out in accordance with the following flow diagram, which shows a five-step process.

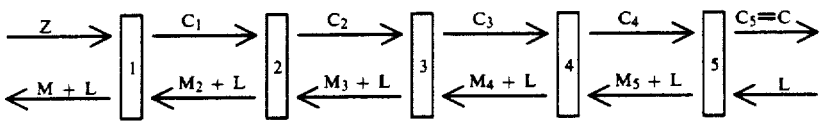

1-5 — Number of steps
Z — Feed direction of material
C — Crystals
M — Mother liquor
L — Solvent
C is the desired pure component, whereas M is more concentrated in the component of components to be removed than is the material Z. Crystallization from the melt permits operation without solvent L.

The process has been suggested and used of feeding the material to a middle step having the same concentration as the material fed. This type of operation results in a mother liquor of an eutectic system having a specially low concentration of desired product, as best the eutectic concentration. For two component systems with solid solution over the whole range of concentration, the pure component can be separated out at the first and last steps, respectively, provided there are a sufficient number of steps.

Theoretical and experimental investigations have shown the actual separation by crystallization to depend on the rate of crystallization and on the mass-diffusion in the stationary or laminar boundary layer between the solid and liquid phase, as expressed by the following equation:

$$k = \frac{k_o}{k_o + (1 - k_o)\exp\left(-\frac{f \cdot \delta}{D}\right)}$$

Where $k_o$ = best possible distribution coefficient with the extremely slow growth of a single crystal k = actual distribution coeffficient with practical rates of crystallization f = rate of crystallization $\delta$ = thickness of boundary layer, where molecular diffusion takes place D = coefficient of molecular diffusion of the component in the fluid boundary layer.

Hitherto, the equation led workers in the art to reduce the boundary layer thickness $\delta$ and to adapt the crystallization rate f to the individual separation problem by promoting natural, or by inducing forced, convection.

It is known that the separation effect in each step of a multi-step crystallization is greatly influenced by the degree to which the mother liquor can be removed from the crystals, the problem arising of removing as much as possible of the mother liquir trapped between crystals or by capillary forces or held on the surface of the crystal layer.

It has been observed that at very high rates of crystallization an unstable supercooling can occur at the crystal-liquor interphase, resulting in a dendritic crystal formation which unfavorably influences separation. It has been proposed to prevent the appearance of this formation by inducing a steady flow of heat, with the attendant temperature gradient, from the liquor to the crystal layer.

It has also been proposed to form the crystals on cooled inside surfaces of tubes, with the liquor flowing at high speed and therefore turbulently, so as to obtain a high value of the actual distribution coefficient k. Further, it is common practice with tube ice manufacturing to feed the water to be frozen as a liquid film falling down on the inside of cooled metal tubes, without, however, the object of separation. The formed ice tubes are removed by melting a thin layer of ice at the boundary between the metal tube and the ice by applying the necessary heat through the metal tubes. The loosened ice tube fall into an ice container.

Also proposed has been to produce pure and very fine salt crystals on the inner surface of vertical tubes, by streaming the dissolved salt as a film down the inner surface while evaporating the solvent. For the formation of a single homogenous crystal a process is known (temperature sequence process for growth of large crystals) by which the number of nucleii is reduced by control of temperature and growth within the crystal forming area.

SUMMARY OF THE INVENTION

The process of the invention can be used to crystallize a component from its melt as well as to separate a component dissolved in a solution; and the invention is applicable to all components that crystallize on rigid, usually metallic, wall surfaces, by cooling, or in certain cases by heating, the opposite wall surface.

A single apparatus employing the process can separate all components that concentrate with crystallization in the liquid phase (distribution coefficient K less than unity) or that concentrate in the crystalline phase (distribution coefficient greater than unity), depending on how the apparatus is operated. The first type of component is more frequent with fractional crystallization and is normally used with the process. Materials having components of both types can be separated with two apparatuses working in series.

The production capacity of the crystallization apparatus is not limited by physical conditions, and can be increased for all requirements by increasing the number of crystallization elements working in parallel.

In accordance with the invention, the process of each individual step can either be continuous or discontinuous, where the discontinuous operation involves advantages in the efficiency of separation.

In a particularly advantageous embodiment of the invention, the single or multi-step fractional crystallization process of the invention occurs in an apparatus consisting of a liquid circulation system, a crystallizer with a collecting tank at the bottom, an intermediate tank for the wash solution, a circulation pump and a heater, a feed tank for each step, an intermediate tank for the mother liquor and an intermediate tank for the pure component, which tanks ae connected via a drain line or a feed pump to the liquid circulation system, the process being conducted in one or more steps, and where the steps are several each successive step produces a purer form of the desired component, the crystallization for all steps occurring in a single apparatus and the number of steps being sufficient to obtain the desired final purity, each single crystallization occurring on vertical surfaces covered by a falling liquid film or on the outside of a horizontal tube bundle, and comprising simultaneous removal, or addition, of heat through the crystallizer walls during circulation of the liquid, with short, periodic addition, or removal, of heat by a heater or cooler, subsequent draining of the mother liquor to the feed tank of the previous step or to the intermediate tank for the mother liquor, washing, with periodic, brief heating or cooling, the crystal-layer surface with circulated liquid from the intermediate wash tank storing liquid that was circulated as the starting material for the crystallization of that step, draining the wash-solution to the feed tank of the step, and feeding the liquid from the feed tank of the following step or from the intermediate tank for pure component into the liquid circulation system to dissolve or melt the crystals in the crystallizer by heating or cooling the circulating liquid.

An object of the invention is an economical process for separating one or more components by a single or multiple-step fractional crystallization.

A further object of the invention is a fractional crystallization process wherein one or more single crystallizations are conducted stepwise and discontinuously.

Another object of the invention is a stepwise fractional crystallization process employing no mechanical aids, such as scrapers and screws, or equipment, such as centrifuges and filters, to separate mechanically the crystals from the mother liquor.

A still further object of the invention is a stepwise fractional crystallization process that employs heat exchange to effect a separation that approaches the theoretically best possible.

Another object of the invention is apparatus for carrying out the process of the invention.

These and other objects of the invention will be apparent from the following detailed description.

BRIEF DESCRIPTION OF THE DRAWING

The invention will be described with reference to the figure of the accompanying drawing, showing an apparatus for carrying out the process of the invention.

DESCRIPTION OF THE PREFERRED EMBODIMENTS

In accordance with the invention, it has been found that a good separation is obtained by crystallization on vertical, usually metallic, wall surfaces, which are cooled, or in special applications heated, from the opposite wall surface. Even where, in the process of the invention, the liquid phase flows as a much smaller stream-like film that is spread over the area of the wall, the separation is superior to that obtained when the liquid phase fills the entire cross section of the means, such as a pipe, down which it flows, the wetted circumference and the quantity of flow for the one case being equal to those of the other. The reason for this is that in the case of the film the flow is turbulent, whereas in the other case, for a given example, the flow has a Reynolds Number of 1600, indicating a laminar flow. The turbulent flow in the falling film has a laminar boundary layer a few tenths of a millimeter thick where mass transfer occurs by molecular diffusion, whereas this boundary layer for a completely laminar flow is approximately ten millimeters thick. The equation for the actual distribution coefficient, reproduced in "Background of the Invention," shows that a distribution coefficient approaching the best possible value is obtainable with film flow, when the crystallization rate is on the order of one cm./hr., as would be required in a big-scale application of the process of the invention, and when the molecular diffusion coefficient in the liquid phase is on the order of $10^{-5}$ cm.$^2$/sec.; whereas in the other case the distribution coefficient is close to one, indicating virtually no separation. If good separation is wanted in the other case, the Reynolds Number must be raised, which necessitates a larger flow and greater power consumption, particularly with viscous organic liquids, rendering operation uneconomical.

In accordance with the invention, it has also been found that a good separation during crystallization occurs even in the laminar region, provided that the waves appearing on the film surface cause a mixing action. Here also the layer thickness is only a few tenths of a millimeter and separation is correspondingly good. The quantity of liquid processed and the power consumed by the circulation pump are relatively little.

In accordance with the invention, the cooled (or in certain applications, heated) vertical walls of the crystallizer are, in a preferred embodiment, in the form of tube bundles having any desired number of vertical, parallel tubes, the liquid being introduced at the tops of the tubes by a distributor to flow down the tubes inner surfaces as a film, and the cooling medium filling the jacket surrounding the tubes. The lower end of the crystallizer incorporates a tank for collecting the liquid phase.

Two other arrangements have been found suitable for crystallization on an industrial scale, in accordance with the process of the invention. In one, crystallization occurs on the outer surfaces of a heat exchanger composed of a bundle of thin, parallel tubes, with baffle plates causing a strong cross flow of the liquid phase. In the other arrangement, the crystals form on the outer surfaces of a horizontal pipe grid, the liquid phase flowing down over the grid. In both arrangements the cross flow about the pipes causes a turbulence producing a general mixing action, the laminar boundary layer at each pipe being then very thin. Similar results are obtained with cooled or, for some applications, heated short fins or baffle plates positioned in the flow to give a pronounced cross flow.

Further in accordance with the invention, it has been found that the separation is improved during crystallization by periodically briefly heating (or cooling, in certain applications) the fluid phase before it enters the crystallizer. This measure yields a smooth crystal surface and avoids dendritic or uneven crystal growth with the attendant undesirable trapping of mother liquid within the crystal layer.

The multi-step, discontinuous crystallization process of the invention is very simply so carried out in a single apparatus that the single crystallizations are cyclically repeated, beginning with the step of the highest concentration of impurity or impurities and advancing to the step of the desired component in its purest form. The investment costs for a multi-step installation of this kind are appreciably less than for one in which each step is conducted in a separate apparatus; and the installation need not be cleaned every cycle, provided that it can be thoroughly drained of the liquid phase by opening the outlet. The small amount of mother liquor held on the surfaces of the crystallizer only slightly contaminates the crystallization of the succeeding step, and going from the "purest" step to the "least pure" step, when ending one cycle and starting another, does not influence the separation.

In accordance with the invention, the process can be conducted in an inert atmosphere.

Further in accordance with the invention, one or more substances can be added before or during a step, or before or during a cycle, to keep the one or more components to be separated in the liquid phase.

Also in accordance with the invention, the crystals of the final step can be further purified by distillation or partial melting and the less pure separated substance returned to the final step.

The surface on which crystallization occurs can be cooled or heated by flowing a heat exchange medium, in the form of a film, over the opposite surface of the crystallizer wall. This surface can be vertical, horizontal, or at any angle therebetween.

In the ensuing detailed description the material processed in a mixture of components which can be crystallized using ordinary cooling water. The desired crystallizer is of the vertical tube type, the figure showing an apparatus for a crystallization cycle composed of ten single-crystallization steps.

The single crystallization step to be described, by way of example, is descriptive of all steps of a cycle, a cycle being a succession of identical single-crystallization steps, the first step being that with the liquid having the lowest concentration of the desired component, and each succeeding step increasing the concentration of the desired component until the last step yields the component in the desired concentration. After one cycle is completed an identical cycle can be started anew.

The following operations for step N are repeated in the same way for all of the other steps of a crystallization cycle.

Start

All of the substance that enters into the crystallization of step N is in the liquid phase and is held in the circulation system, shown schematically in the figure, and circulated by a pump D from the collecting tank of the crystallizer A to the pump D thence through the heater B to the top of the crystallizer A, and finally down the crystallizer-walls back to the collecting tank. The intermediate wash solution tank E is filled with a part of the circulating liquid and is separated from this liquid by closed valves. The cooling medium is pumped from a cooling medium tank I by a pump K into a cooler H and by a shunt line back to tank I. The crystallizer A is not cooled and the heater B is not supplied with heating medium. There is a feed tank for each step of the cycle, the tanks being numbered 1 to 10 in the figure, and the numbers thereof being the same as those of their steps. Each feed tank contains the starting material for its step.

Crystallization

By closing the said shunt line, the cooling medium is admitted to the crystallizer A. The cooling medium flows downwards on the outside of the crystallizer tubes as a film, causing a pronounced supercooling of the inner surface of the crystallizer tubes and a local crystallization of the liquid phase, which latter, in the form of a film, runs down the inner surface. The local crystallization grows until a continuous layer of crystals is formed. After crystallization is initiated the cooling medium is by-passed about the cooler H, until it has been warmed to the normal crystallization temperature, whereupon part of it is pumped through the cooler H to maintain a constant rate of crystallization. During initiation and carrying out of the crystallization, the circulating liquid phase is periodically heated at short intervals by the heater B. The warm liquid phase rapidly flowing down over the growing crystal layer melts the crystal needles protruding from the crystal-layer surface and so assures a generally smooth and even crystal surface, parallel to the tube surface, on which new crystals can grow, and thus avoids inclusions of mother liquor in the crystal layer. Before the crystallization is ended the cooling medium is withdrawn from the crystallizer A by opening the shunt line; the crystallization is continued by the previously effected super-cooling of the crystal layer until the latter is at substantially the same temperature as the liquid phase.

Draining the mother liquid

The circulation pump D is shut off and those valves opened that permit the mother liquid to drain from the circulation system into the feed tank of step N−1 so that the largest part of the mother liquid is drained off of the surface of the crystal layer.

Washing the crystal surface

The wash-liquid stored in wash tank E is circulated by pump D through heater B and into the crystallizer A, where it flows downwards as a film over the crystal layer. The concentration of the wash-liquid is equal to that at the beginning of the crystallization of the step N. With the addition of heat from heater B, the remaining crystals clinging to the crystal-layer surface are washed and melted off.

Draining the wash-liquid

With the circulation pump D shut off, the valves are opened so that the wash-liquid is drained into the feed tank of step N.

Melting the crystals

The liquid in feed tank for step N+1 is pumped into the liquid circulation system by pump C. With pump D circulating the liquid and with heat from heater B, the hot liquid melts the crystals down to the inner surface.

The liquid level in the crystallizer collecting tank increases steadily during the melting. As soon as the rate of increase approaches zero, or the temperature rises, the melting is finished. During the entire melting procedures the two valves of the wash tank E are open, and are subsequently closed at the end of the melting, the wash tank being full.

End

The same conditions prevail as did at the beginning of step N. The succeeding step N+1 can be started.

After all the steps of the cycle have been completed, the following procedures are carried out.

Draining the liquor tank F

The liquid is preferably recycled to a previous separation stage or to a distillation stage for recovery.

Shutting off the pump D

All of the liquid in the circulation system including that in the wash tank is drained into the feed tank of the last step of the cycle until the liquid therein has reached its normal level, and the remainder via the intermediate tank G for the pure component into the pure component tank (not shown). In this way, there is stored in the tank G the liquid for dissolving the crystals grown in the last step of the next crystallization cycle.

The contents of the feed tank for step 1 are fed into the circulation system by pump C, the valves to the wash tank E being open.

Pump D is started up and the valves to the wash tank E are closed. The next crystallization cycle can start immediately with step 1.

Alternate procedures (a) If the crystallization temperature of the component is very low, the heat of crystallization has to be removed by means of refrigeration equipment. To economise on power consumption the following schemes can be used.

The crystallizer A can be cooled directly by the refrigerant of the refrigeration unit, the refrigerant in the vapor phase being withdrawn from the jacket in which the crystallizer tubes are located; or by incorporating the evaporator of the refrigeration unit in the cooling circulation system. The heat generated in the condenser of the refrigeration unit can be partly stored in a tank for a heating medium and used in heater B to heat during crystallization and during melting of the crystals. The excess heat is removed by ordinary cooling water or in extreme cases by a second refrigeration unit.

(b) With a component crystallizing markedly above 100° C. the heat of crystallization can be removed in cooler H or crystallizer A by direct evaporation of a cooling medium, preferably water, where the produced vapor can be used for other heating purposes.

(c) The initiation of crystallization by spontaneously producing nucleii can be performed with circulation pump D stopped, and with exceptional low temperatures cooling medium. The spontaneous formation of crystals occurs in the thin liquid film clinging to the inner tube-surface and remaining from the crystal melting of the previous step. The subsequent crystallization occurs in the usual manner, after the temperature of the cooling medium has been raised to the normal temperature prevailing at the beginning of the crystallization.

Advantages of the process of the invention

The process can be used for crystallization from a melt as well as from a solution. Specifically, it is possilbe to crystallize simply from a melt in several succeeding steps, which hitherto has been considered difficult to do on an industrial scale. The process is used advantageously for final purification of the very large number of products that are thermally stable at their melting points.

The process yields components with purities comparable to those obtained by zone-melting. The method of stepwise crystallization results in considerably higher separation per step than zone-melting. Compared to many applications of zone-melting, the present process results in a much higher yield of the pure component.

The investment costs for a plan employing the process of the invention are exceptionally small, because the plant consists mainly of tanks and heat exchangers, and crystallization occurs in only a single piece of equipment. Since investment costs are the major cost factor in separation operations, the present process is very economical.

Energy consumption is equal to or less than that of known processes. The high separation efficiency of each step and the optimum operation of successive, separate steps result in a very low energy consumption that is increased somewhat by the heat introduction, in accordance with the invention, to obtain a favorable crystal surface during crystallization.

The process can be fully automated by means of a programme, printed on a chart or on revolving discs. The control is facilitated since the quantity of component crystallized out of the film is always shown by the level of the remaining liquid in the crystallizer collecting tank. The same is true while melting the crystals.

Since the equipment involves no mechanically operated parts except pumps and valves and since no solids are separated or mechanically transported, a plant operating in accordance with the invention is extremely reliable.

The melting of the crystals with hot liquid from the supply tank of the next step occurs with very rapid heat transfer and therefore in a very short time. The customary slow dissolving of solids in tanks is avoided.

Considerable time is saved because the successive crystallization steps of the process can be immediately started without having first to drain and refill the whole system.

Since not all of the heat of the film is given up to the walls of the crystallizer tubes, the average temperature of the liquid phase lies somewhat above the temperature of crystallization, thereby suppressing the formation of crystal nucleii in the circulating liquid phase during crystallization.

Example I.—Single-step process

The initial substance consists of 1200 g. of technical grade molten naphthalene with 1 g. of methyl violet dissolved for tagging. A 180-liter/hour pump feeds the melt from a container to the top of a vertical metal tube, two meters long and 25 mm. inside diameter. The melt, as a film, flows down the inside of the pipe, is collected at the bottom of the tube, and returned to the container. The outside of the tube is jacketed and the temperature of the jacket thermostatically controlled. The path of the melt incorporates a 330 watt heater. Heat losses in the path are made up for by additional electrical heating.

At the beginning of crystallization the temperatures of the path and the jacket are both 88° C. The temperature of the latter is quickly lowered to 48° C., then continuously raised during a two minute period until it reaches 72° C., at which it is held constant for four minutes, whereupon it is steadily lowered during a 14 minute period until it reaches 40° C. at the end of crystallization. The melt temperature in the path falls during the first two minutes of crystallization to 81° C. and thereupon remains constant. During the entire crystallization period the heater is turned on full power for 20 seconds every minute.

With crystallization completed, the remaining liquid is drained and the crystals are removed by heating the tube. Recovered are 800 g. of melt with a methyl violet concentration of one eighth of the initial concentration, whereas the drained 400 g. liquid have a corresponding increase in concentration. During crystallization the circulating liquid was purely in the liquid phase.

Example II.—Five-step process

With the same initial mixture and the same apparatus as described in Example I, the process consists of five steps, each step being conducted in the same manner as described in Example I.

For starting the process the feed tanks of each step are filled with 400 g. naphthalene and with methyl violet in that amounts corresponding to the respective step. The crystallization cycle begins with the step of highest methyl violet concentration (step 1) and continues to that of the lowest concentration (step 5). After each step of crystallization, the remaining 400 g. of melt are drained to the feed tank of the previous step. Then 400 g. of melt from the feed tank of the next higher step are pumped into the crystallizer. The liquid is circulated and heated to melt the crystals in the crystallizing tube.

With all crystals melted, the new crystallization is initiated immediately afterwards by lowering the temperature in the jacket as described in detail in Example I. From step 1, 100 g. of melted crystals are withdrawn as a final product, rich in impurities. The remaining 300 g. are put back into the feed tank of step 1, with another 500 g. of initial solution added for the following five-step cycle.

After completion of the crystallization operation of step 5, the remaining melt is drained into the feed tank of step 4, and 400 g. of the melted final product are pumped into the apparatus and the crystals are melted as described above. 800 g. of the combined melt are drained into the final product tank, the remaining 400 g. into the feed tank of step 5.

After the five-step cycle has been repeated several times, the concentrations in the feed tanks of the respective steps remain constant. Each subsequent cycle now yields 400 g. of pure water-free naphthalene and 100 g. of naphthalene with a high content of methyl violet, from 500 g. of initial melt fed. The pure naphthalene is even free from the yellowish tinge present in the technical grade naphthalene used to make the initial melt.

Although the preferred embodiments of the invention have been described, the scope of, and the breadth of protection afforded to, the invention are limited solely by the appended claims.

I claim:

1. A method of segregating a high melting point ingredient of an initial liquid mixture of high and low melting point ingredients by a fractional crystallization procedure carried out on amounts of said mixture of successively higher concentration of said high melting point ingredient contained in a corresponding series of vessels, comprising in a cycle of operation as a first step the passing of an amount of the mixture contained in the first vessel of said series of vessels over a cooled surface thereby causing formation of a layer of crystals of said high melting point ingredient on said cooled surface, and draining the remainder of said mixture into a vessel for mother liquor, as a second step for passing of [an] *a* heated amount of the mixture contained in the second vessel of said series of vessels over said layer of crystals while suspending the cooling of said surface thereby melting said crystals, *recommencing cooling of said surface and circulating the mixture to form a layer of crystals on the cooled surface,* and returning the resulting liquid mixture to said first vessel, repeating [said second step] *the same procedures beginning with the aforementioned second step but with mixture contained in each succeeding vessel of said series of vessels and* with mixture from each succeeding vessel returned to the respective preceding vessel until the contents of the next to the last vessel of said series of vessels has been crystallized on said cooled surface and the remaining mixture has been returned to the next preceding vessel, the layer of crystals on said cooled surface then being of the required concentration, passing the mixture contained in the last vessel of said series of vessels in heated condition over said last mentioned layer of crystals and returning a first portion of the resulting mixture to said next to the last vessel until filled, a second portion to the last vessel until filled, and a third portion to a place of use or storage, draining said vessel for mother liquor, filling said first vessel with another supply of said initial liquid mixture which completes said cycle of opertions, and repeating said cycle of operations as required.

2. The method according to claim 1, in which the mixtures from said successive vessels are passed as a descending film over said surface.

3. The method according to claim 1, in which solvents are added to at least some of said vessels.

* * * * *